United States Patent
Yu et al.

(10) Patent No.: US 10,530,711 B2
(45) Date of Patent: Jan. 7, 2020

(54) EXTENSIBLE VIRTUAL SWITCH DATAPATH

(71) Applicant: Nicira, Inc., Palo Alto, CA (US)

(72) Inventors: Cheng-Chun Yu, Redwood City, CA (US); Jonathan Stringer, San Jose, CA (US); Justin Pettit, Los Altos Hills, CA (US)

(73) Assignee: Nicira, Inc., Palo Alto, CA (US)

( * ) Notice: Subject to any disclaimer, the term of this patent is extended or adjusted under 35 U.S.C. 154(b) by 128 days.

(21) Appl. No.: 15/808,161

(22) Filed: Nov. 9, 2017

(65) Prior Publication Data

US 2019/0140983 A1 May 9, 2019

(51) Int. Cl.
| | |
|---|---|
| G06F 9/455 | (2018.01) |
| H04L 12/26 | (2006.01) |
| H04L 12/931 | (2013.01) |
| H04L 29/06 | (2006.01) |

(52) U.S. Cl.
CPC .......... *H04L 49/65* (2013.01); *G06F 9/45558* (2013.01); *H04L 43/028* (2013.01); *H04L 49/70* (2013.01); *H04L 69/22* (2013.01); *G06F 2009/45595* (2013.01)

(58) Field of Classification Search
CPC ....... H04L 43/028; H04L 49/65; H04L 49/70; H04L 69/22; G06F 9/45558; G06F 12/1018; G06F 16/137; G06F 16/22; G06F 16/2228; G06F 16/2255; G06F 16/38; G06F 2009/45595
See application file for complete search history.

(56) References Cited

U.S. PATENT DOCUMENTS

| | | | | |
|---|---|---|---|---|
| 8,761,187 | B2* | 6/2014 | Barde | H04L 49/70 370/386 |
| 8,886,827 | B2* | 11/2014 | Goel | H04L 45/7453 709/238 |
| 8,908,693 | B2* | 12/2014 | Neugebauer | H04L 45/7457 370/392 |
| 9,231,871 | B2* | 1/2016 | Mehta | H04L 45/22 |
| 9,299,434 | B2* | 3/2016 | Douglas | G11C 15/04 |
| 9,356,866 | B1* | 5/2016 | Sivaramakrishnan | H04L 45/7453 |
| 9,379,973 | B2* | 6/2016 | Mekkattuparamban | H04L 49/70 |
| 9,426,071 | B1* | 8/2016 | Caldejon | G06F 16/245 |
| 9,596,159 | B2* | 3/2017 | Ghose | H04L 45/586 |
| 9,648,133 | B2* | 5/2017 | Owens | H04L 67/32 |
| 9,654,392 | B2* | 5/2017 | Borkmann | H04L 45/66 |
| 9,680,748 | B2* | 6/2017 | Jackson | H04L 45/748 |
| 9,762,494 | B1* | 9/2017 | Mehta | H04L 45/22 |
| 9,804,952 | B1* | 10/2017 | Cohen | G06F 11/3644 |
| 9,876,701 | B1* | 1/2018 | Caldejon | G06F 16/245 |
| 9,917,769 | B2* | 3/2018 | Anand | H04L 45/54 |
| 10,129,239 | B2* | 11/2018 | Bell | H04L 63/1433 |
| 10,135,687 | B2* | 11/2018 | Kashyap | H04L 41/0893 |

(Continued)

*Primary Examiner* — Alpus Hsu (74) *Attorney, Agent, or Firm* — Patterson + Sheridan, LLP (57) ABSTRACT

Certain embodiments described herein are generally directed to configuring an extended Berkeley Packet Filter (eBPF) fast path. In some embodiments, a fixed-length array of actions is generated and loaded into the eBPF fast path, where each element of the array indicates a type of action for execution on a packet received by the eBPF fast path. In some embodiments, the eBPF fast path is loaded with a number of eBPF programs, each configured to execute a different type of action.

24 Claims, 6 Drawing Sheets

(56) References Cited

U.S. PATENT DOCUMENTS

| | | | |
|---|---|---|---|
| 10,218,647 B2* | 2/2019 | Wang | H04L 49/9094 |
| 2014/0092900 A1* | 4/2014 | Kisela | G06F 13/00 |
| | | | 370/389 |
| 2016/0094460 A1* | 3/2016 | Shelar | H04L 45/56 |
| | | | 370/392 |
| 2016/0232019 A1* | 8/2016 | Shah | G06F 9/45558 |
| 2017/0054685 A1* | 2/2017 | Malkov | H04L 63/0227 |
| 2017/0054686 A1* | 2/2017 | Malkov | G06F 9/45558 |
| 2017/0353433 A1* | 12/2017 | Antony | H04L 49/70 |
| 2018/0375773 A1* | 12/2018 | Gobriel | H04L 45/7457 |

\* cited by examiner

EXTENSIBLE VIRTUAL SWITCH DATAPATH

BACKGROUND

In virtualized computing systems, host machines generally host a plurality of virtual machines. In hosting virtual machines, a host machine may provide a virtual switch that connects virtual machines running on the host to communicate with other virtual machines hosted on the same host machine as well as virtual machines hosted on other hosts. The virtual switch may be configured with internally-maintained forwarding tables that are populated by a control plane for determining how to process and forward ingress packets. In some cases, the virtual switch may be an Open vSwitch (OVS), which is an open-source implementation of a distributed multi-layer virtual switch that provides a switching stack for a hardware virtualization environment (e.g., kernel-based virtual machine (KVM), which is a virtualization solution for Linux that includes a kernel module that provides functionality of a hypervisor in the kernel of Linux). The architecture of OVS includes two major components: a slow path which handles the complexity of a protocol such as OpenFlow and a fast path. The OVS slow path, which maintains a full determination of what actions need to be executed to accurately forward a packet to its next destination, typically resides in the user space of the host machine's operating system. The fast path typically resides in the kernel of the host operating system and acts as a caching layer for efficient packet lookup and forwarding. More specifically, for each ingress packet, the fast path consults a flow table to search for and execute a list of actions associated with the packet. The actions may include forwarding the packet to a particular destination port(s) or modifying the packet etc.

The fast path may be updated from time to time to include new features (e.g., using a microflow cache for its flow table, using two layers of caching for its flow table, etc.). Adding a feature in the fast path conventionally may require coding the feature separately for different operating systems. For example, due to differences in how the operating systems function (e.g., how the operating system processes received packets, how the operating system handles firewalling, etc.), implementing the feature on different operating systems may require different platform-specific code for each operating system. Accordingly, the software development cycle of a new fast path feature may become complex and require detailed platform-specific knowledge.

SUMMARY

Herein described are one or more embodiments of a method for processing data packets at a generic packet filtering subsystem on a host machine. The method includes receiving a packet. The method also includes generating a key based on at least one of header information and metadata of the packet. The method also includes mapping the key to a fixed-length array, the fixed-length array including a plurality of elements, wherein each of the plurality of elements provides an indication of a type of action to execute on the packet. The method further includes executing one or more actions corresponding to one or more types of actions indicated by the plurality of elements of the fixed-length array using one or more action programs.

Also described herein are embodiments of a non-transitory computer readable medium comprising instructions to be executed in a computer system, wherein the instructions when executed in the computer system perform a method described above for processing data packets at a generic packet filtering subsystem on a host machine.

Also described herein are embodiments of a computer system configured for executing the method described above for processing data packets.

DETAILED DESCRIPTION

Embodiments presented herein relate to systems and methods for processing data packets at a generic packet filtering subsystem on a host machine. In one example, the generic packet filtering subsystem used for processing packets is the extended Berkeley Packet Filter (eBPF). In some cases, although a generic packet filtering subsystem provides extensibility and flexibility, it may also provide a set of restrictions to guarantee runtime safety. These restrictions pose challenges when the generic packet filtering subsystem is intended to be configured and used to implement the functions of a virtual switch. Accordingly, certain embodiments described herein are also directed to configuring the generic packet filtering subsystem for performing the functions of a virtual switch while resolving challenges that may be posed because of the set of restrictions imposed by the generic packet filtering subsystem.

Figure 1:
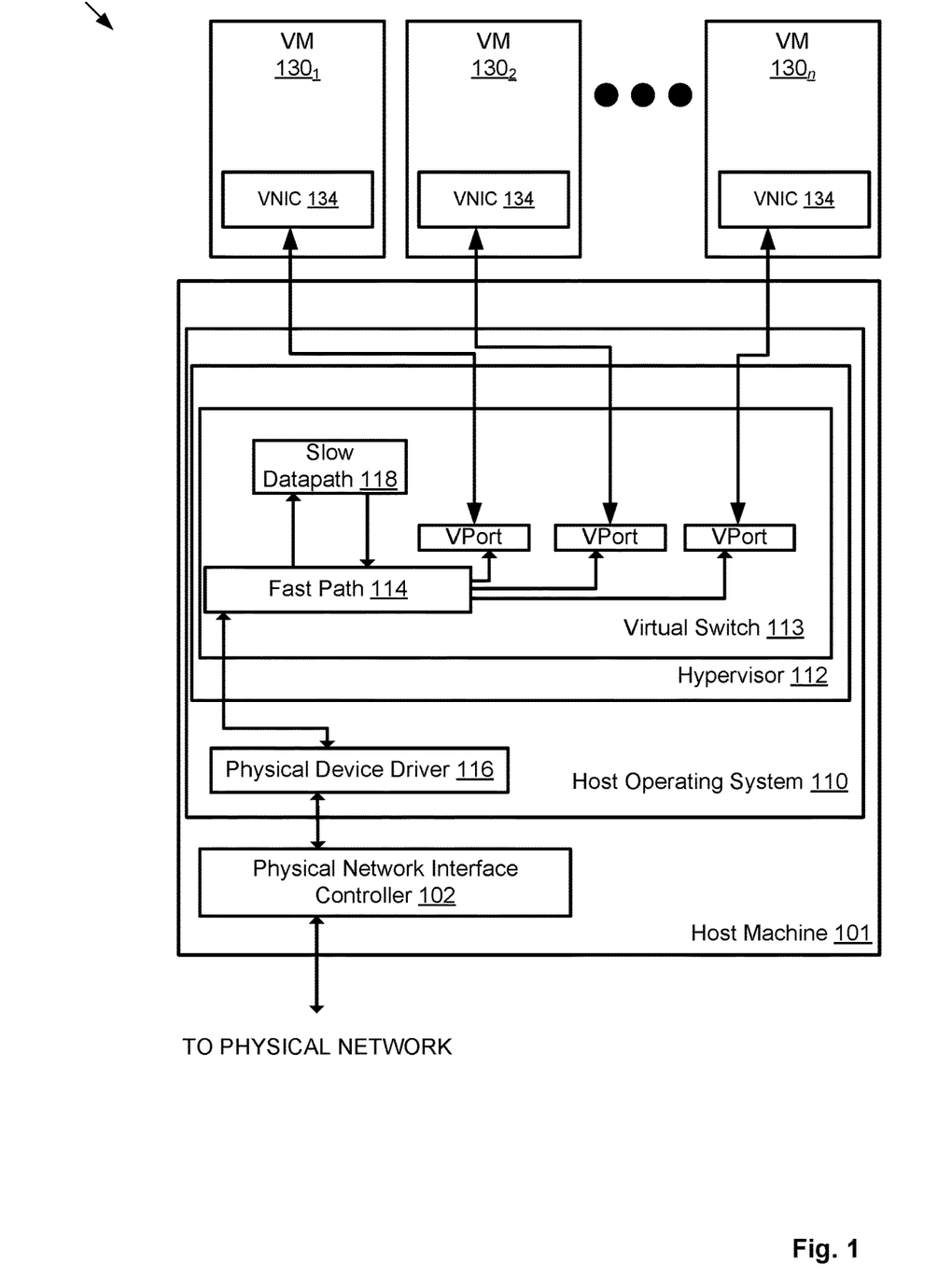
FIG. 1 illustrates an example block diagram of a host machine for use in a virtualized network environment, according to some embodiments.

FIG. 1 illustrates an example block diagram of host machine 101 for use in a virtualized network environment, according to some embodiments. As illustrated, host machine 101 includes a physical network interface controller (PNIC) 102, a host operating system 110, a hypervisor 112, and a plurality of virtual machines (VMs) 130. Although not shown in FIG. 1, host machine 101 may also include one or more central processing units (CPUs), system memory, non-volatile data storage, etc. These components, together with one or more network interfaces, such as PNIC 102, enable host machine 101 to communicate with a physical network, which may include other hardware computing platforms, entities, or a number of other host machines, each of which may similarly host a plurality of virtual machines. In some cases, some or all VMs 130 hosted by host machine 101 may be interconnected together as part of a logical overlay network. The logical overlay network may also include additional VMs running on other host machines in the physical network.

As shown, hypervisor 112 and the plurality of VMs 130 reside on host machine 101. Hypervisor 112 serves as an interface between guest VMs 130 and PNIC 102, as well as other physical resources available on host machine 101. Though certain embodiments are described herein with respect to VMs, the same principals and techniques may also apply to other appropriate virtual computing instances (e.g., containers (e.g., Docker containers), data compute nodes, isolated user space instances, namespace containers, etc.). Each VM 130 includes a virtual network interface card (VNIC) 134, which is responsible for exchanging packets between VM 130 and hypervisor 112. VNICs 134 may be, in some cases, a software abstraction of a physical network interface card. Each virtual machine 130 is connected to a virtual port (vport) provided by virtual switch 113 through a VNIC 134.

Virtual switch 113 carries a VM's traffic to the physical network and to other VMs. Virtual switch 113 is connected to PNIC 102 to allow network traffic to be exchanged between the virtual machines 130 executing on host machine 101 and network destinations on an external physical network (e.g., host machines and/or VMs running on those host machines in the physical network).

While hypervisor 112 is illustrated as including virtual switch 113, it should be recognized that hypervisor 112 may additionally expose virtual ports to one or more virtual machines 130 using a virtual router or other virtual networking infrastructure provided by hypervisor 112. Hypervisor 112, in some embodiments, may run in conjunction with a conventional operating system in host machine 101. For example, as shown in FIG. 1, hypervisor 112 runs on host operating system 110 (e.g., in the kernel space of host operating system 110) residing on host machine 101. In one example of such embodiments, host operating system 110 is a Linux operating system and hypervisor 112 may be implemented as a KVM. Although not shown in FIG. 1, in some other embodiments, hypervisor 112 can be installed directly on host machine 101 and insert a virtualization layer between the hardware and each one of guest operating systems of the VMs 130. In yet some other embodiments (also not shown) hypervisor 112 includes system level software component and a privileged virtual machine that may contain physical device drivers (not shown), virtual switch 113, or other hypervisor components. In some embodiments, virtual switch 113 may be implemented as an OVS.

Figure 2:
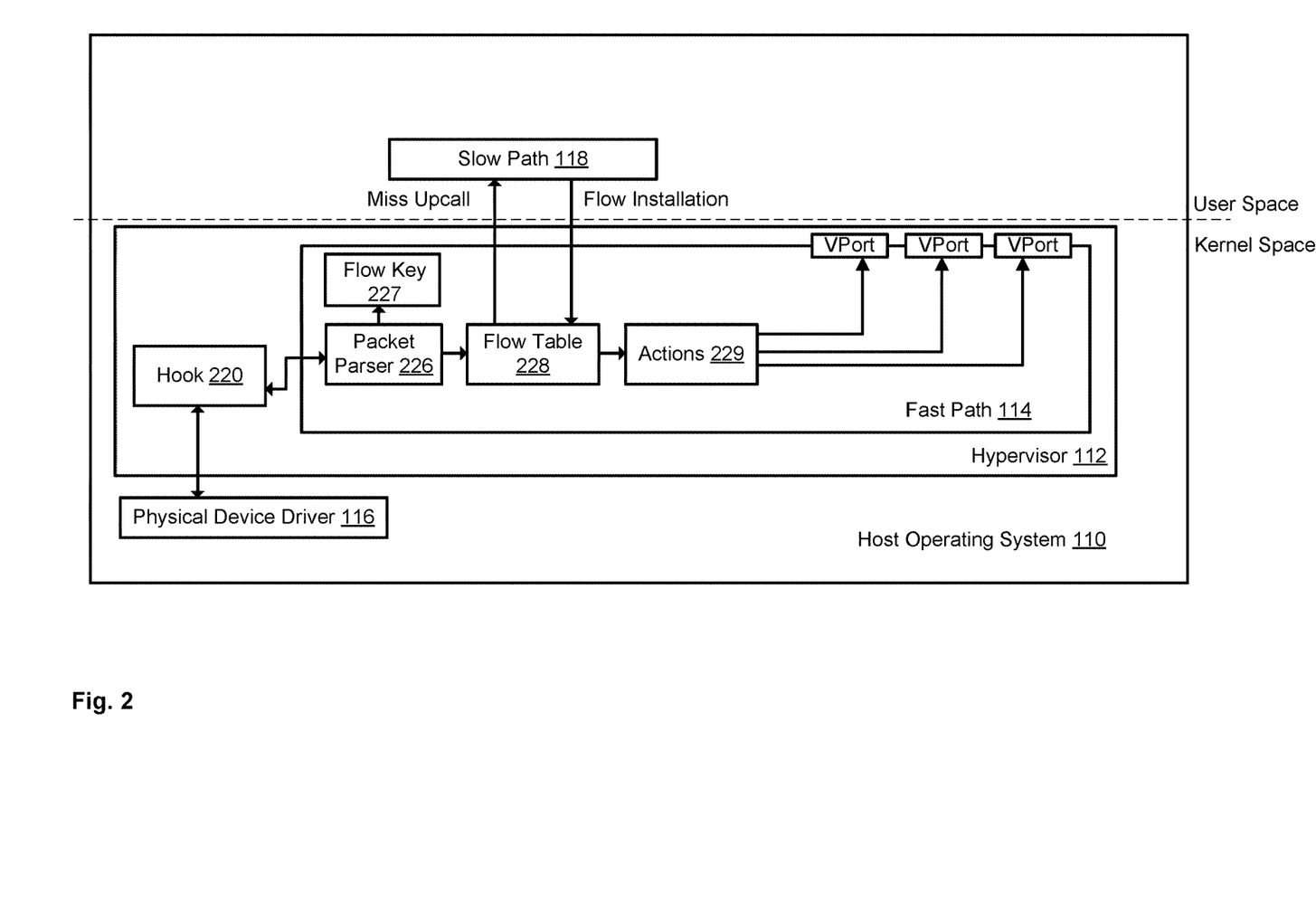
FIG. 2 illustrates, in more detail, example components of the virtual switch implemented in the host operating system of the host machine of FIG. 1, according to some embodiments.
Figure 3:
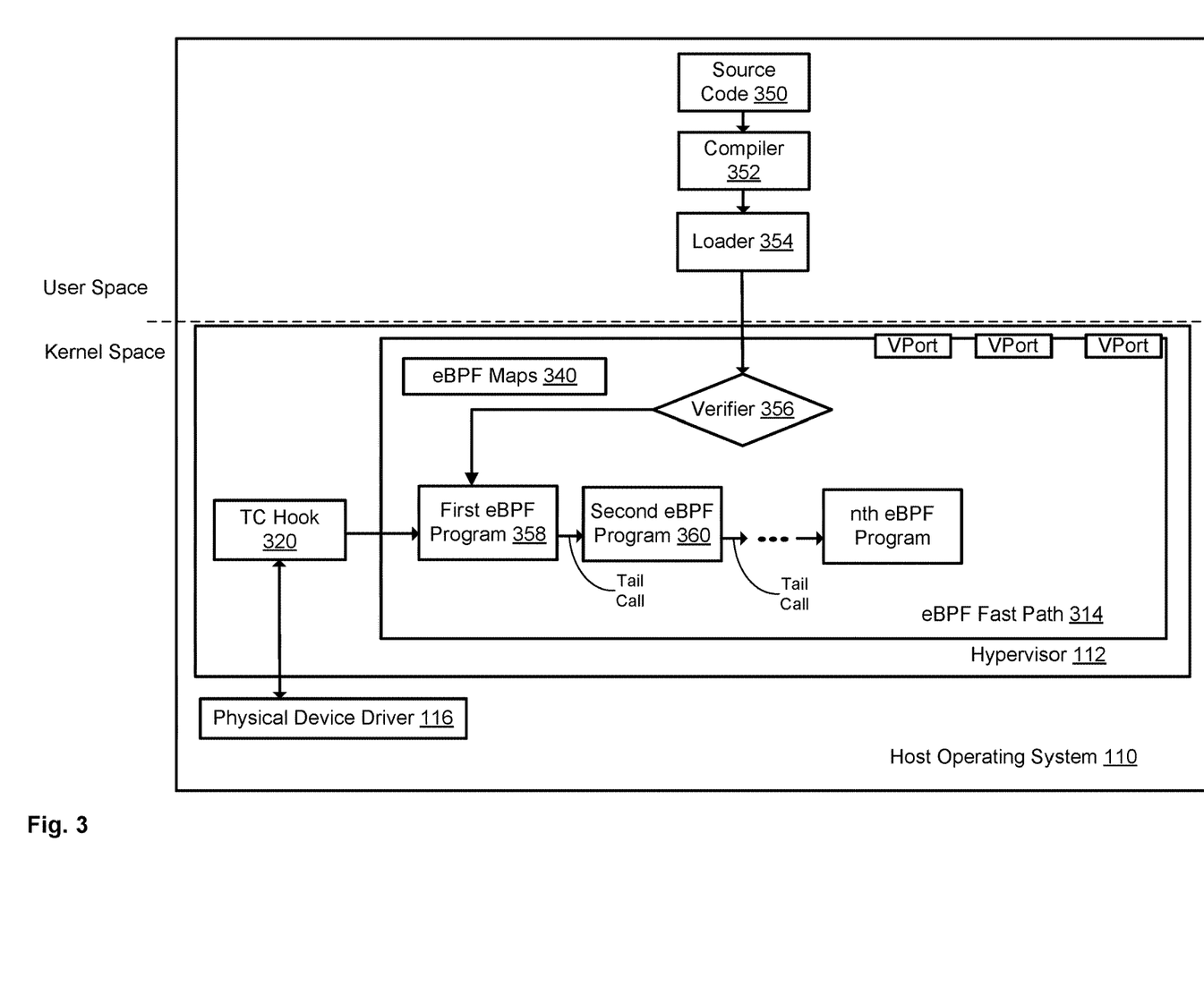
FIG. 3 illustrates an example workflow diagram for loading extended Berkeley Packet Filter (eBPF) programs and maps into an eBPF fast path residing in the host operating system's kernel space as well as how packets trigger the execution of the eBPF programs residing in eBPF fast path, according to some embodiments.
Figure 4:
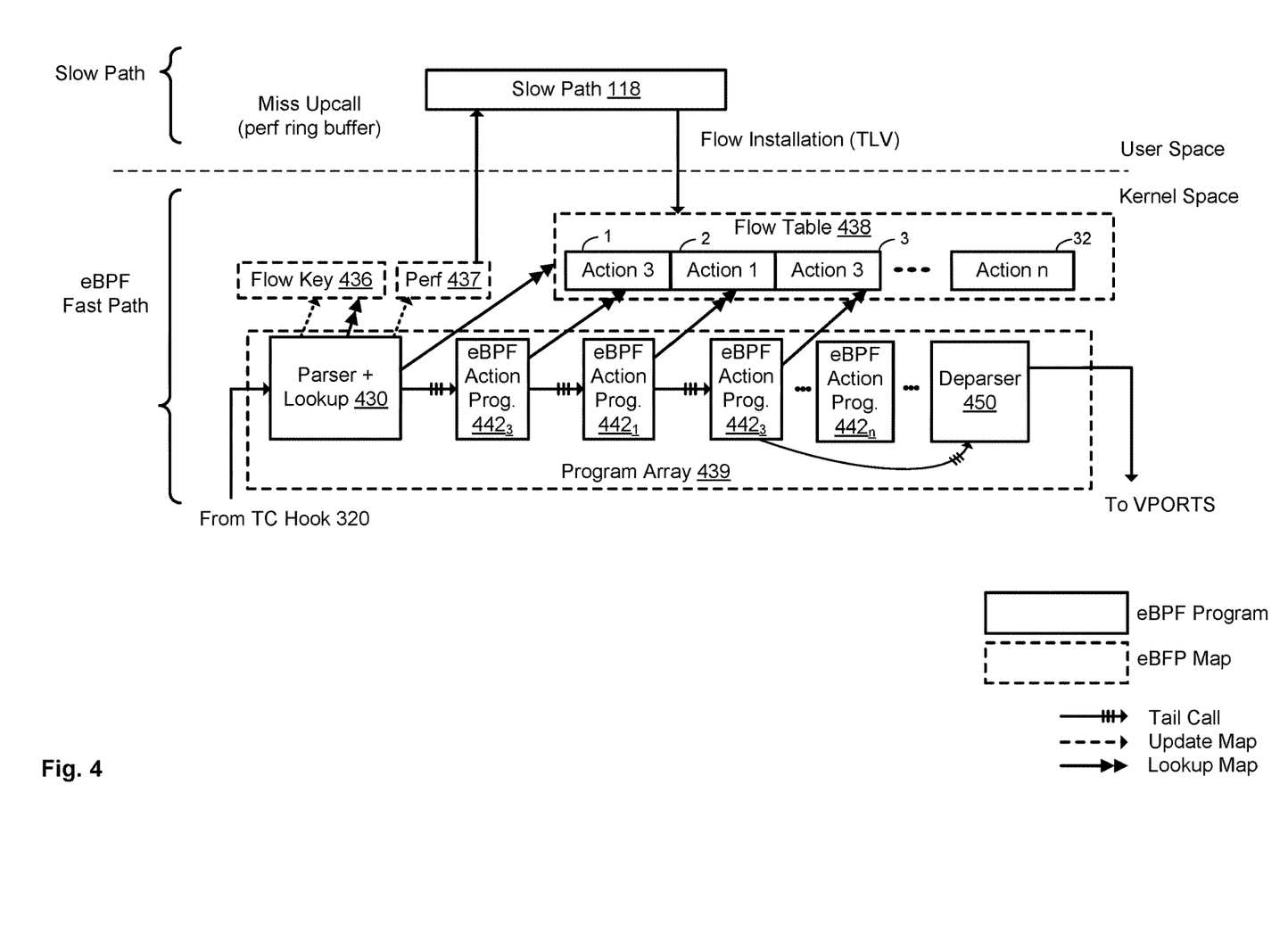
FIG. 4 illustrates, in more detail, the packet processing operations of an eBPF fast path, according to some embodiments.

Virtual switch 113 includes a slow path 118 and a fast path 114 (e.g., an OVS fast path). In some embodiments, the slow path 118 resides in the user space of host operating system 110 while fast path 114 resides in the kernel of host operating system 110, as shown in FIGS. 2-4. However, it should be noted that, in other embodiments, the slow path and fast path may not necessarily be in the user space and kernel space, respectively. For example, both the fast path and slow path may be in the user space, both the fast path and the slow path may be in the kernel space, etc. Virtual switch 113 begins processing packets shortly after the packet is received by PNIC 102. Virtual switch 113 determines how and where (i.e., which vports) to forward a packet to based on information included in the packet's headers. FIG. 2 illustrates how virtual switch 113 performs packet processing and forwarding.

FIG. 2 illustrates, in more detail, example components for implementing a virtual switch (e.g., virtual switch 113) in a host operating system (e.g., host operating system 110) of a host machine (e.g., host machine 101, not shown in FIG. 2). FIG. 2 illustrates hook 220, which may be an entry point in code implementing a network stack in the kernel to which virtual switch 113 is attached in order to process passing packets. In one example, the hook may be a bridge hook in the Linux bridge code. As shown in FIG. 2, fast path 114 is attached to hook 220 by, for example, registering certain packet processing functions of fast path 114 to be called by hook 220 for a packet received at hook 220. Accordingly, when packets arrive at hook 220, fast path 114 starts processing them by parsing the packets, using packet parser 226, to extract relevant protocol headers (e.g., IP headers, etc.) from the packet, shown as flow key 227. For example, flow key 227 may correspond to one or more addresses or values in the header of the packet. Next, fast path 114 stores flow key 227 locally (e.g., in a manner that is efficient for performing look-ups). Subsequently, fast path 114 uses flow key 227 to perform a look-up of flow table 228. Flow table 228 matches a certain flow key to a particular flow (e.g., list of actions) that specifies the functions or actions that are to be executed on the flow key's corresponding packet. For example, flow table 228 may be a hash table that maps each flow key (e.g., or a hash value thereof) on the table to a certain list of actions.

If flow key 227 does not match any entries in flow table 228, fast path 114 passes the packet up to slow path 118 using an interface, such as a Linux generic netlink interface. Slow path 118 may be a module in the user space of host operating system 110. In some embodiments, slow path 118 may be a user space program referred to as "OVS-vswitchd". Slow path 118 maintains a full determination of what actions (e.g., forwarding the packet to a particular vport(s) or modifying the packet to insert a tunnel context or a virtual local area network (VLAN) ID and, thereafter, forwarding the packet to an external port for transmission to a destination host in the physical network) need to be executed to accurately forward the packet to its next destination. Sending the packet up to slow path 118 is a process called "packet upcall" and typically occurs when the first packet of a series of packets is being processed by fast path 114.

As an example, host machine 101 may receive a series of packets from another VM running on another host machine in the physical network, all carrying the destination IP address of a certain VNIC 134 of a VM 130 (e.g., VM $130_1$) in their IP headers. When the first packet from the source VM arrives, the flow key extracted from the packet by packet parser 226 may not match any existing entries in flow table 228. As a result, as described above, fast path 114 passes the packet up to slow path 118, which may already be configured by a controller (e.g., control plane) with the flow key and a corresponding action list. In some embodiments, if slow path 118 is not configured with the packet's flow key and corresponding list of actions to perform on the packet based on the flow key, slow path 118 may consult the controller, which may then configure slow path 118 with that information in response. Slow path 118 then installs the flow key and the list of actions in flow table 228 and reinserts the packet into fast path 114. Once the packet is reinserted, packet parser 226 parses the packet again, generates the flow key and performs a look-up of flow table 228 using the flow key. However, this time a matching entry is found for the flow key and a list of actions (e.g., actions 229) may be retrieved from flow table 228. The list of actions is then executed on the packet resulting in the packet being forward to its final destination (e.g., one of the vports).

Subsequently, because flow table 228 is now configured with the first packet's flow key, any subsequent look-ups of flow table 228 using the same flow key results in a matching entry and, therefore, the flow key's corresponding action list, actions 229. Accordingly, for any subsequent packets arriving with the same flow key, fast path 114 is able to find a match for the flow key in flow table 228 and retrieve actions 229 for execution without using slow path 118. Fast path 114 then executes actions 229 for these subsequent packets with the same flow and updates the flow's statistics. A flow's statistics may be the number of packets and bytes that have passed through the flow, the elapsed time since the flow last processed a packet (if ever), etc.

Fast path 114 may implement one or more different features, and further fast path 114 may be modified to add, remove, or edit certain features. For example, fast path 114 may use a microflow cache for its flow table, essentially caching exact-match entries of flow keys corresponding to separate flows to a list of actions. In another example, fast path 114 may use two layers of caching: a microflow-cache and a megaflow-cache, where the megaflow-cache caches flow keys corresponding to multiple flows. Other features may include connection tracking, stateful network address translation, and support for layer 3 tunneling protocols. Modifying fast path 114 to include new features, as discussed, may conventionally require difficult platform-specific coding.

Accordingly, certain embodiments herein relate to using an extensible, platform-independent, and generic packet filtering solution. The generic packet filter solution, may enable applications (e.g., compiled in the user-space) to customize and extend a kernel's functionality. One such example is the extended Berkeley Packet Filter (eBPF), which may be loaded into the kernel space of host operating system 110 for implementing functions of fast path 114. EBPF, initially referred to as the BPF, is an instruction set architecture for filtering packets in the kernel space of an operating system (e.g., Linux). FIG. 3 shows an example eBPF fast path 314 configured to implement and perform functions of fast path 114 of FIG. 2.

FIG. 3 illustrates an example workflow diagram for loading eBPF programs (e.g., eBPF program 358) and maps (e.g., eBPF maps 340) into eBPF fast path 314 residing in the host operating system's kernel space as well as how packets trigger the execution of the eBPF programs residing in eBPF fast path 314. In some embodiments, eBPF fast path 314 may be code included in the host operating system's kernel source code. EBPF fast path 314 is configured to enable eBPF programs and maps to be loaded into the kernel space. There are a variety of hook points to which the eBPF programs and maps can be attached to when being loaded. An example of such a hook point is the traffic control (TC) hook 320, which may be an entry point in code implementing a network stack in the kernel. More specifically, TC hook 320 runs shortly after the physical device driver 116 receives a packet.

FIG. 3 further illustrates source code 350, compiler 352, and loader 354, in the user space of host operating system 110. Source code 350 contains the code for eBPF programs (e.g., eBPF program 358) and maps (e.g., eBPF maps 340). In some embodiments, the eBPF source code might be written in C programming language, which compiler 352 takes as input and compiles down to an eBPF instruction set and, subsequently, generates an ELF (executable and linkable format) file that contains the eBPF instructions. In some embodiments, the compiler may be a LLVM+Clang compiler. LLVM (Low Level Virtual Machine), is a collection of modular and reusable compiler and toolchain technologies used to develop compiler front ends and back ends. Clang is a compiler front-end for a number of programming languages and uses LLVM as its back end. After the ELF file is generated by compiler 352, in some embodiments, loader 354 (e.g., IProute) takes the ELF file, parses information relating to the eBPF programs (e.g., eBPF programs 358, 360, etc., as described below) and eBPF maps (e.g., eBPF maps 340 described below) and issues BPF system calls (i.e., syscalls) to load the eBPF programs and eBPF maps into the eBPF fast path 314 residing in kernel space of host operating system 110. However, before the eBPF programs and maps are loaded into kernel, they are subjected to an inspection or verification process performed by verifier 356, as further described below. For example, in order to prevent kernel crashes or security issues, verifier 356 inspects eBPF programs to ensure that they terminate and are safe to execute.

If the eBPF programs and maps pass verifier 356's inspection, they are then attached to the desired hook point, which, in some embodiments, is TC hook 320, as described above (although other hook points may be used in some other embodiments). EBPF operates in an event-driven model on a particular hook point. Each hook point has its own execution context and execution at the hook point only starts when a particular type of event occurs. For example, an eBPF program (e.g., first eBPF program 358) attached to a raw socket interface (e.g., TC hook 320) has a context, which includes the packet, and the eBPF program is only triggered to run when there is an incoming packet to the raw socket. As a result, once the eBPF programs are hooked to TC hook 320, any packets arriving at TC hook 320 triggers the execution of the eBPF programs, starting with first eBPF program 358.

Within the kernel space of host operating system 110, eBPF instructions run in a virtual machine environment that interprets the eBPF code for the processor of the underlying host machine (e.g., host machine 101) to enable the processor to perform the eBPF instructions. For example, the virtual machine provides registers, stack space, a program counter, and helper functions. Helper functions are provided for eBPF fast path 314 to interact with the rest of the kernel space of host operating system 110. The eBPF virtual machine provides a completely isolated environment for its bytecode running inside. As a result, an eBPF program, for example, may not arbitrarily call other kernel functions or gain access into memory outside eBPF fast path 314. To interact with components outside eBPF fast path 314, the eBPF architecture provides a white-list of helper functions that an eBPF program is able to call, depending on the context of the eBPF program. As an example, an eBPF program (e.g., first eBPF program 358) attached to a raw socket in a packet context may invoke virtual local area network (VLAN) push or pop related helper functions, while an eBPF program with a kernel tracing context may not.

To store and share state, eBPF provides a mechanism to interact with a variety of key/value stores, shown as eBPF maps 340 in FIG. 3. EBPF maps 340 reside in the kernel space of host operating system 110 and may be shared and accessed by eBPF programs and user space applications. EBPF programs (e.g., eBPF programs 358, 360, etc.) are able to access eBPF maps 340 through the helper functions, as described above, while user space applications are able to access eBPF maps 340 through eBPF system calls or memory-mapped regions. EBPF maps 340 may be one or more types of data structures. In some embodiments, eBPF maps 340 may be hash tables or arrays etc. EBPF maps 340 are created by a user space program and may be shared between multiple eBPF programs running in any hook point.

FIG. 3 also shows an eBPF tail call mechanism allowing one eBPF program, such as first eBPF program 358, to trigger the execution of another eBPF program, providing users with the flexibility of composing a chain of eBPF programs with each one focusing on particular features. Unlike a conventional function call, this tail call mechanism calls another program without returning back to the caller's program. The tail call reuses the caller's stack frame, which allows the eBPF implementation to minimize call overhead and simplifies verification of eBPF programs.

EBPF provides extensibility and flexibility while also implementing a set of restrictions to guarantee runtime safety. However, eBPF's restrictions pose certain challenges when configuring the eBPF programs and maps to implement and perform the functions of a fast path or fast path that performs switching. First, as described above, each eBPF program (e.g., first eBPF program 358) runs in an isolated environment and may not arbitrarily access kernel functions, as access is restricted to only a whitelisted set of functions. Second, as described above, before any eBPF programs or maps are loaded into the kernel space of host operating system 110, they are required to pass verifier 356. When inspecting eBPF programs and maps, verifier 356 starts from the first instruction that is received from loader 354 and traverses all possible paths, simulating the execution of every instruction and observing whether there is any violation to the environment isolation. This includes ensuring that the program terminates and to ensure that the termination takes place, verifier 356 disallows dynamic looping. The verifier 356 is also configured to disallow loading an eBPF program into the kernel space that exceeds a certain fixed number of bytecode instructions. For example, verifier 356 may impose a limit of 4,096 bytecode instructions, although the limit may be different in different implementations. In addition, verifier 356 enforces a complexity limit such that the number of instructions traversed during the verification is limited to a certain fixed number. For example, verifier 356 may impose a limit of 64 k bytecode instructions, although the limit may be different in different implementations.

As described above, these restrictions pose challenges when the eBPF programs and maps are intended to be configured and used to implement the functions of a fast path (e.g., packet forwarding). More specifically, as described in relation to FIG. 2, in order to determine how to forward a certain packet, fast path 114 requires access to a list of actions, which is configured by slow path 118 in the user space and then loaded into fast path 114. A typical list of actions that lays out the different actions for execution on a certain packet may have a variable length depending on the desired network processing behavior for the packet. However, because of the verifier's restriction relating to dynamic looping, a single eBPF program may not be able to iterate across the list of actions (e.g., with each iteration of the loop dealing with a particular action in the list). In addition, each action list having a variable number of actions poses another challenge because, as described above, the list may be larger than the 4,096 bytecode instruction limit that is allowed by the verifier for a single eBPF program.

Accordingly, certain embodiments described herein are directed to configuring slow path 118 and eBPF fast path 314 of FIG. 3, including eBPF maps and eBPF programs, for performing the functions of virtual switch 113 while resolving the challenges described above.

More specifically, in order to address the verifier 356's limit on the number of bytecode instructions per eBPF program, slow path 118 may be configured to generate a plurality of eBPF action programs, each of which may contain bytecode instructions for a certain action. Generally, there may be a universe of, for example, 12 action types that are used for modifying and forwarding packets in virtual switch 113. As such, slow path 118 may generate 12 eBPF action programs, each containing code (e.g., eBPF bytecode instructions) for executing one or more of the 12 types of actions on a packet. As an example, one action type may be an "output" action type. In such an example, the corresponding "output" eBPF action program may contain bytecode instructions for outputting a packet to a certain port or interface. In another example, another action type may be a "push-VLAN" action type. In such an example, the corresponding "push_VLAN" eBPF action program may contain bytecode instructions for pushing or inserting a VLAN ID into the packet's VLAN (virtual local area network) tag.

In some embodiments, there may be fewer or more action types and, therefore, fewer or more corresponding eBPF action programs may be generated and configured. After configuring the eBPF action programs, slow path 118 loads them into a program array (e.g., program array 439, as described in relation to FIG. 4) in the kernel space of the host operating system, while assigning each of the eBPF action programs an index number to enable tail calling, as further described below. As a result of this, instead of having a single eBPF program contain the code and logic of an entire action list, as discussed, each eBPF action program is configured to contain the code and logic of a single action (or in another example more than one action, but less than all actions), which generally includes fewer bytecode instructions than the maximum number of bytecode instructions (e.g., 4,096 bytecode instructions) an eBPF program is allowed to contain because of the verifier 356's restrictions. Accordingly, the eBPF action programs may all be loaded into the kernel space without running afoul of verifier 356's limit on the number of bytecode instructions per eBPF program.

As described above, verifier 356's complexity limit and its restriction against dynamic looping also block the loading of variable-length action lists. As a result, to address these restrictions, in some embodiments, slow path 118 may be configured to convert an action list into a fixed-length array of actions, where each element in the array indicates the action type of each action in the action list. For example, slow path 118 may store or retrieve an action list for a flow key relating to a certain packet. The action list may include 3 actions, where the first action on the list may be of action type 3, the second action on the list may be of action type 1, and the third action may be of action type 3. In such an example, slow path 118 generates an action array with a fixed number of elements (e.g., 32), where the first element includes an indication of action type 3, the second element includes an indication of action type 1, and the third element includes an indication of action type 3, etc. The indication may be in different forms, such as a number or a term. For example, in some embodiments, the first element of the array may state "output," which indicates one of the action types using a term, as described above, while the second element of the array may state "push_VLAN."

As described above, corresponding eBPF action programs (e.g., eBPF action programs 442, as shown in FIG. 4) for executing each of these action types are already loaded into the kernel space with index numbers. For example, an eBPF action program for action type 3 (e.g., output) may be loaded into the kernel space with index number 3 (shown in FIG. 4 as eBPF action program $442_3$), while an eBPF action program for action type 1 (e.g., push_VLAN) may be loaded into the kernel space with index number 1 (shown in FIG. 4 as eBPF action program $442_1$), etc. The action array (e.g., action type 3, action type 1, action type 3, etc.), therefore, provides an indication to eBPF fast path 314 about which eBPF action programs to execute for a certain packet and in what order. In the example above, the first element of the action array (which may state "output") indicates that the first eBPF action program to execute is eBPF action program 3, which then tail calls to eBPF action program 1, (i.e., because the second element of the array may state "push_ VLAN"), which further tail calls to eBPF action program 3 again, etc.

In some embodiments, the fixed-length action array may have 32 elements, as shown below in FIG. 4. When generating the array, if the original action list has less than 32 actions to execute, one or more of the actions in the action array may be no-ops or NULL (e.g., an action type that indicates that no further operations need to be executed). For example, an action list may have a list of 16 actions to be executed for a certain flow key. In such an example, the fixed length 32-element action array, generated by slow path 118, populates the first 16 elements of the action array with corresponding actions types of the 16 actions on the action list, in order, and designates the remaining 16 elements of the array as no-op. In such an example, as described below, after the $16^{th}$ eBPF action program corresponding to the $16^{th}$ element of the action array executes, the action execution skips the remaining 16 elements and the $16^{th}$ eBPF action program tail calls to a deparser (e.g., deparser 450), whose function is further described below in relation to FIG. 4.

In some embodiments, an original action list for a certain flow may have more than 32 actions to execute. In such an embodiment, the eBPF fast path 314 may delegate the execution of the packet's actions to the user space (e.g., slow path 118). As an example, when an action list has more actions that the number of elements in the array (e.g., 32 in the example above), slow path 118 may insert a special action type in the last element of the array that indicates to the eBPF fast path 314 that there are more actions to be executed than what is indicated by the array and that, therefore, the eBPF fast path 314 may delegate the execution of the actions to the user space.

FIG. 4 illustrates, in more detail, the implementation of an eBPF fast path 314 using the fixed-length action array as well as the eBPF action programs generated by slow path 118, as described above. FIG. 4 shows a number of eBPF maps (e.g., flow key 436, Perf 437, and flow table 438) as well as eBPF action programs (e.g., parser+lookup 430, eBPF action programs 442, and deparser 450). The eBPF maps, which may be shared between different eBPF action programs and slow path 118, include a flow key 436, perf 437, a flow table 438, and a program array 439.

Flow key 436 is an internal representation of one or more of the protocol headers and metadata for the current packet being processed. Perf 437 is an event map that allows an eBPF action program (e.g., parser+lookup 430) to store user-defined data into a ring buffer, which may be read by a user space program (e.g., slow path 118), and therefore may be referred to as a perf ring buffer. A ring buffer is a circular software queue with a first-in-first-out (FIFO) data characteristic. The ring buffer queue is used to serialize data from, for example, one process to another. For example, the queue collects data from one process so that another process can fetch the data at a later time for further processing. Slow path 118 maps this ring buffer to read packets and metadata from the eBPF action program for upcall processing.

Flow table 438, in some embodiments, is a hash table containing a plurality of hash values and a plurality of corresponding action arrays. Each hash value, for example, may be a 32-bit value corresponding to a flow key of a packet. For example, a hash value may be derived from the flow key of a packet to search for a match in flow table 438. If flow table 438 contains the matching hash value, a corresponding fixed-length action array may be identified for the packet. Flow table 438 illustrates an example fixed-length array having 32 elements, where the first element contains an indication of action type 3, and the section element contains an indication of action type 1, and the third element again indicates action type 3. The action array is, as described above, configured and generated by slow path 118 for a specific flow key and, subsequently, loaded into flow table 438.

Figure 5A:
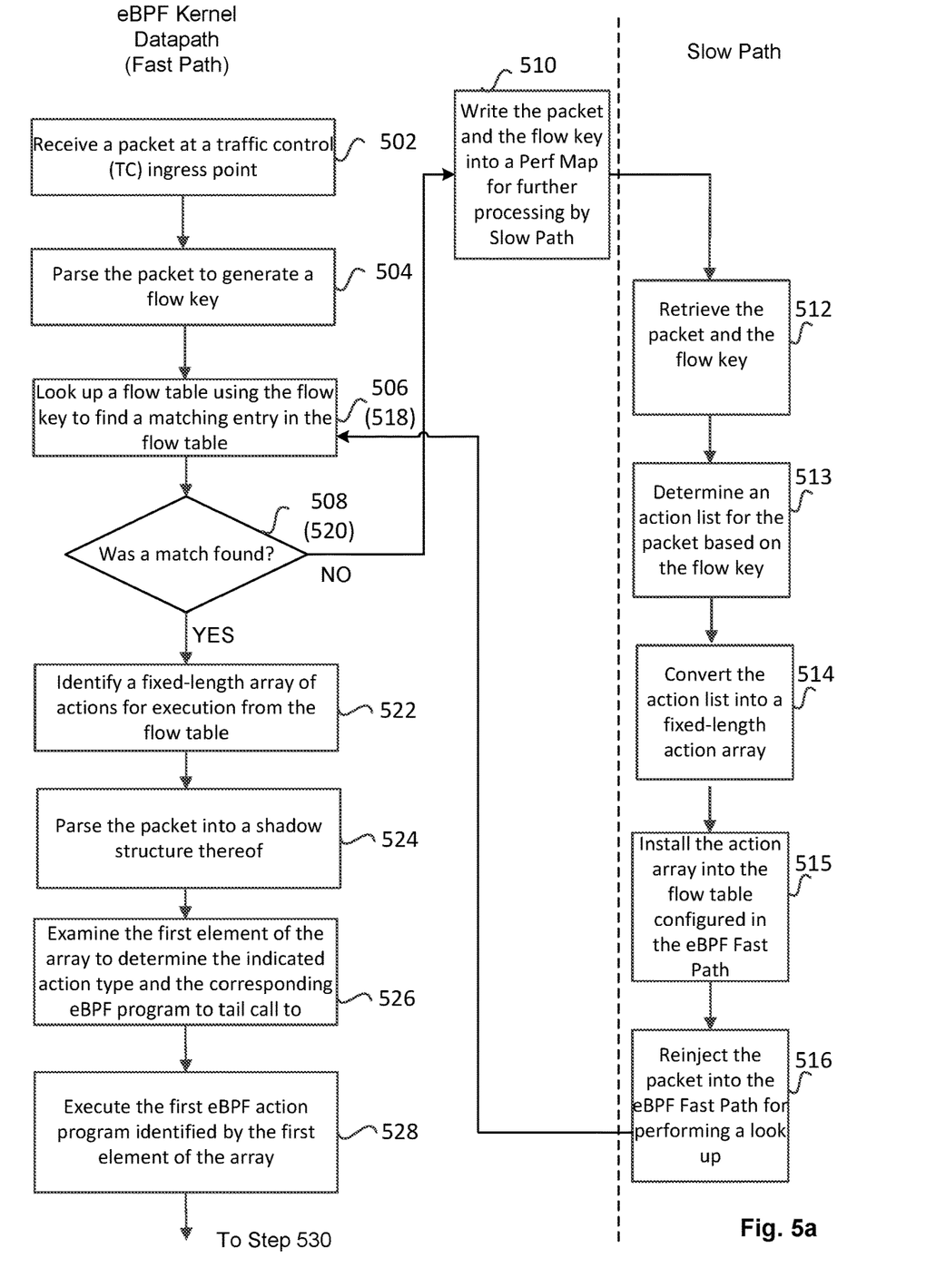
FIGS. 5a and 5b illustrate an example flow diagram corresponding to different operations performed by the eBPF fast path and the slow path of FIG. 4 during the processing of a packet, according to some embodiments.

Program array 439 allows eBPF action programs to tail call other eBPF action programs. As described above, a number of eBPF action programs (e.g., eBPF action programs 442), each containing bytecode instructions to execute an action of a certain type, are inserted into program array 439. As further described above, each eBPF action program is assigned a certain unique index number, which is also stored in program array 439. At run time, an eBPF action program (e.g., eBPF action program $442_3$) is able to tail call another eBPF action program (e.g., eBPF action program $442_1$) by referring to the index numbers stored within program array 439. For example, as further described below in relation to FIG. 5, the eBPF action program execution for the action array shown in FIG. 4 includes executing the eBPF action program with index number 3 (e.g., shown as eBPF action program $442_3$), corresponding to action type 3 (i.e., indicated by the first element of the array), and tail calling to the eBPF action program with index number 1, corresponding to action type 1 (i.e., indicated by the second element of the array), etc.

In some embodiments, each action in the fixed-length action array may also include certain action-specific metadata so that the corresponding eBPF action program is able to accurately and completely execute the action for the specific packet. For example, an output action (e.g., action type 3 in element 1) may include an interface index (ifindex) (i.e., action-specific metadata) to indicate the output interface so that the corresponding eBPF action program (e.g., eBPF action program $442_3$) is able to output the packet to the right interface. As a result, in some embodiments, each element of the array not only contains an indication of the action type to be executed on the corresponding packet, but also the metadata that may be used by the eBPF action program for a complete execution. In such embodiments, the size of each element, accordingly, is configured to be large enough to hold metadata for any action, along with the indication of the type of action to be executed. As an example, the first element of the action array shown in FIG. 4 may indicate, output: 2, where output is the action type and 2 is the action-specific metadata.

In addition, because each eBPF action program executes in an isolated environment, in some embodiments, some state may be transferred between a currently executing eBPF action program and the next. In some embodiments, the state to transfer from one eBPF action program to another includes (1) The flow key, so that the currently executing eBPF action program is able to lookup flow table 438, and (2) the element number of the current array element, so that the eBPF action program is able to determine that it is currently performing an execution corresponding to the Nth element of the action array and, at the end of its processing, to tail-call an eBPF action program corresponding to the action type indicated by the (N+1)th element of the action array. In some embodiments, eBPF may use either per-CPU maps as scratch buffers or the context's packet control block (cb) to pass data between programs. For example, in some embodiments, a 32-bit value in the cb may be used to keep track of the element numbers and the per-CPU maps may be used to save the flow key.

As described above, eBPF action programs and maps, shown in FIG. 4, are collected into a single ELF-formatted object file before they are loaded into the kernel space. In some embodiments, one of the eBPF action programs (e.g., parser+lookup 430) is marked within the ELF file to indicate that it must be attached to the eBPF hook point (e.g., TC hook 320). As a result, when that eBPF action program (e.g., parser+lookup 430) is loaded into the kernel space, it is attached to the eBPF hook and, at the time of execution, the remaining eBPF action programs are executed via tail calls rooted in the eBPF hook point.

As discussed above, the first eBPF action program is triggered by TC hook 320, which is associated with one or more particular network devices (e.g., PNIC 102). In some embodiments, multiple instances of the same eBPF action program may be triggered simultaneously on different CPU cores receiving traffic from different devices. In some embodiments, the eBPF maps have a single instance across all cores. In some embodiments, however, an eBPF map may have various instances across a number of different cores. In some embodiments, access to map entries are protected by the read-copy-update (RCU) mechanism of the kernel, which makes it safe for various eBPF action programs or user space applications to concurrently read from an eBPF map. However, in some cases, the kernel may not provide a built-in mechanism to protect programs writing to the eBPF maps, which may result in a race condition. Accordingly, in some embodiments, for flow table 438, only slow path 118 is allowed to insert into or remove elements from flow table map 438 from a single thread. For flow statistics, atomic operations are used to avoid race conditions. Other maps, such as flow key 436, perf 437, program array 439, etc., may use per-CPU instances to manager synchronization.

As described above, when a packet arrives at TC hook 320, the eBPF fast path 314 begins executing a series of eBPF programs, beginning with parser+lookup 430. In some embodiments, the parser function of the parser+lookup 430 eBPF program, which is loaded from the user space to the kernel space of host operating system 110, as described above, comprises a number of components: (1) standard protocol parsing, and (2) operating system (OS)-specific metadata parsing (e.g., Linux-specific). The standard protocol parsing is executed directly on the packet bytes based on standardized protocols, while the platform or OS-specific metadata parsing may occur on the context provided by the eBPF environment.

In some embodiments, the standard protocol parsing logic may be written by leveraging a domain-specific language (e.g., P4) for programming flexible hardware switches, such as P4 switches. In some embodiments, first a description of the desired protocol support is written in P4. Next, a P4-to-eBPF compiler may be used to generate the protocol parser as eBPF bytecode. The eBPF bytecode is then extended to include platform-specific metadata parsing for an ingress hook (e.g., TC hook 320) context. Such a context provides information such as an index number for a network device from which the packet is being received as well as any packet hash provided by the network device.

The resulting eBPF byte code is then able to parse a packet and assemble a flow key for the packet. This flow key is then stored in flow key map 436, as described above, and is used by the lookup function of parser+lookup 430 to look for a matching entry in flow table 438.

In addition to parser 430, another eBPF program shown in FIG. 4 is deparser 450. Deparser 450, in some embodiments, is an inverse to parser 430. In the P4 programming model, when processing packets, a P4 switch parses the packet into a shadow structure of the packet, executes the actions on this shadow structure, and only applies the execution to the actual packet contents of the packet during the final deparser stage. For example, an incoming packet, having protocol headers as well as payload, may contain a total number of bytes (e.g., 256 bytes). The P4 switch, however, may only parse and extract bytes that correspond to the protocol headers because only information relating to the packet's headers is used for switching purposes. As an example, the incoming packet may include 64 bytes corresponding to protocol headers and the rest may correspond to the payload. In such an example, the P4 switch may insert the 64 bytes of the protocol headers into another data structure, referred to as the shadow structure. During action execution, the P4 switch may perform any necessary modifications to this shadow structure instead of the actual packet. For example, if an eBPF action program (e.g., eBPF action program $442_1$) is configured to change the incoming packet's headers by, for example, pushing a VLAN tag into the packet's headers, the action is executed on the shadow structure (e.g., the VLAN tag is inserted into the shadow structure). After the completion of the action execution, deparser 450 receives and examines the shadow structure to apply any changes made to the shadow structure to the actual packet's headers.

Accordingly, deparser 450 is an eBPF program that contains eBPF bytecode instructions for making changes to the contents of the packet based on the changes made to the shadow structure of the packet during action execution. This process allows architecture-specific optimizations to be applied (e.g., grouping memory accesses).

Figure 5B:
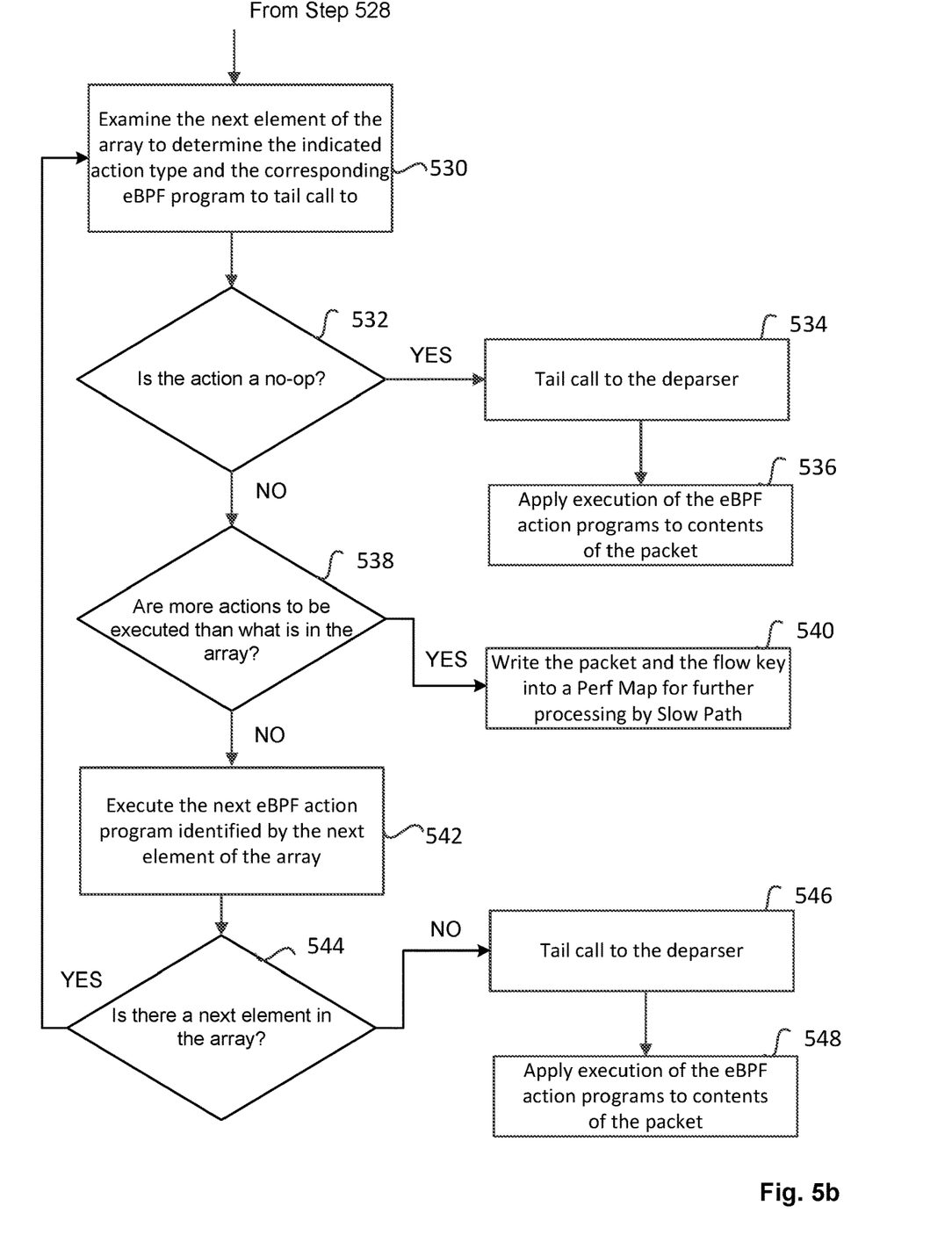

FIGS. 5a and 5b illustrate an example flow diagram 500 corresponding to the different operations performed by the eBPF fast path 314 and the slow path of FIG. 4 during the processing of a packet. Steps 502-538 of FIGS. 5a-5b are described by reference to the components of FIG. 4.

At 502, parser+lookup 430 receives a packet from TC hook 320.

At 504, parser+lookup 430 parses the protocol headers and/or metadata of the packet to generate a flow key that is stored in flow key map 436. As an example, a packet may include an IP header, that includes a source IP address and a destination IP address, as well as metadata, which parser+lookup 430 parses to generate the flow key.

At 506, parser+lookup 430 looks up flow table 438, using the packet's flow key stored in flow key map 436, to find a matching entry in flow table 438.

At 508, parser+lookup 430 may determine whether a match for the packet's flow key was found or not. If a match was not found, the packet is sent by the eBPF fast path 314 to slow path 118 for processing, as illustrated by steps 510-516 of flow diagram 500. If a match was found, the eBPF fast path 314 continues processing the packet, as shown in steps 522-538 of flow diagram 500.

At 510, parser+lookup 430 writes or inserts the full packet, received at step 502, and its flow key, generated at step 504, into a perf ring buffer, shown as perf 437 in FIG. 4. In some embodiments, an eBPF helper function (e.g., skb_event_output( )) may be used to allow parser+lookup 430 to pass data to the user space through perf 437.

At 512, slow path 118 retrieves the packet and the flow key from perf 437. In some embodiments, slow path 118 runs a thread, which maps perf 437 to the slow path 118's virtual memory and regularly polls perf 437 for new data. If there is incoming data from perf 437, the thread is woken up to retrieve the packet and the flow key from perf 437 for processing.

At 513, slow path 118 determines an action list for the packet based on the flow key.

At 514, slow path 118 converts the action list into a fixed-length action array, where each element of the array, as described above, includes an indication of the type of action that may be executed on the packet as well as certain action-specific metadata. As an example, the action list may include three actions of (1) output, (2) push_VLAN, and (3) output, etc. Slow path 118 may then convert this action list into an action array with a fixed length of, for example, 32. After the conversion, the action array may have a first element that states "output: 2," where "output" indicates the action type and "2" is the action-specific metadata. The second element of the array may state "push_VLAN: 100," where "push_VLAN" is the action type and "100" is the action specific metadata. The third element may state "output: 3," having the same format as described above in relation to the other elements.

At 515, slow path 118 installs the action array, generated at step 514, into the flow table in the kernel space. As described above, because the action array has a fixed length, it passes the verifier 356's inspection and is loaded into flow table 438.

At 516, slow path 118 reinjects the packet into the eBPF fast path 314 for processing. In some embodiments, a dedicated network TAP device (i.e., a virtual Ethernet adapter enabling Ethernet tunneling), which also has the parser+lookup 430 attached to it, may be used for enabling the reinjection of the packet. In such embodiments, slow path 118 sends the packet using an AF (arbitrary Ethernet frame) PACKET socket, triggering parser+lookup 430 for further processing.

Returning to 506, parser+lookup 430 looks up flow table 438 using the packet's flow key, stored in flow key 436, for a second time to find a matching entry.

At 508, as a result of slow path 118 inserting an action array for the packet (e.g., flow to which the packet belongs) into flow table 438, parser+lookup 430 determines that a matching entry is found for the packet's flow key.

At 522, parser+lookup 430 identifies the fixed-length array of actions that is returned by the flow table in response to the lookup for execution. Continuing with the example discussed above, flow table 438 may return an action array with the following elements: element 1 (output: 2), element 2 (push_VLAN: 100), element 3 (output: 3), and elements 4-32 (no-ops).

At 524, parser+lookup 430 then parses the packet that has been reinjected by slow path 118 to create a shadow structure of the packet. In some embodiments, all the actions of the action array are performed on the shadow structure of the packet and not the actual packet contents. However, after the action execution on the shadow structure is complete, the deparser 450 performs the necessary changes on the contents of the packets, as further described below.

At 526, parser+lookup 430 examines the first element of the action array to determine the indicated action type. In the example above, parser+lookup 430 examines the first element of the action array, which may indicate action type 3, "output: 2." As described above, when loading eBPF action programs, each eBPF action program, which corresponds to a certain action type, is given a unique index number that is stored in the program array (e.g., program array 439). For example, an eBPF action program that contains bytecode instructions for performing action type "output," may be given index number 3 when being loaded into the kernel space. As a result, by determining the action type indicated by the first element of the action array, parser+lookup 430 is able to further determine which eBPF action program to tail call to. In the example above, parser+lookup 430 tail calls the eBPF action program with index number 3 (e.g., eBPF action program 442₃).

As described above, in the embodiments described herein, when one eBPF program tail calls another eBPF program, the state of the process is transferred to the eBPF program that is being tail called. For example, when parser+lookup 430 tail calls eBPF action program 442₃, parser+lookup 430 transfers the packet's flow key as well as the array element number that eBPF action program 442₃ needs to refer to. Passing the flow key to eBPF action program 442₃ enables it to lookup flow table 438 and identify the flow key's corresponding action array. Similarly, passing the array element number to eBPF action program 442₃ enables it to refer to the correct element (e.g., element 1) to fetch action-specific metadata in order to perform the execution. It also enables the currently executing eBPF program to identify the next element (e.g., element 2) in the action array that needs to be executed.

At 528, eBPF fast path 314 executes the first eBPF action program identified by the first element of the action array on the shadow structure of the packet. For example, eBPF action program number 1 (e.g., eBPF action program 442₃) executes the "output" action using the action-specific metadata "2." After the execution of the action corresponding to the first element, the currently executing eBPF program (e.g., eBPF action program 442₃) may examine the next array element (e.g., element 2) and determine if additional actions need to be executed.

Therefore, at 530, the currently executing eBPF program (e.g., eBPF action program 442₃) examines the next element (e.g., element 2) to determine the indicated action type and the corresponding eBPF program to tail call to. After examining the next element, at 532, the currently executing eBPF program determines if the action is a no-op. If the action is a no-op, at 534, the currently executing eBPF program (e.g., eBPF action program 442₃) tail calls to deparser (e.g., deparser 450). Subsequently, at 536, deparser 450 applies changes to the contents of the packet based on the changes made to the shadow structure during action execution. As a result of this, in some embodiments, the packet may be modified and forwarded to its intended destination (e.g., a vport).

If the next element of the action array is not a no-op, at 538, the currently executing eBPF program (e.g., eBPF action program 442₃) further determines if there are more actions to be executed than what is in the array. As described above, in embodiments where the original action list contains more than 32 actions, slow path 118 may be configured to populate the last element of the 32-element action array with an action type that indicates there are more actions to be executed on the packet than what is contained in the array. If, at 538, the currently executing eBPF program examines the next element and determines that the action indicates there are more actions to be executed than what is contained in the array, at 540, the currently executing eBPF program writes the packet and the flow key into perf 437 for further processing by the slow path 118.

If, however, the action type is neither a no-op nor indicates that there are more actions to be executed than what is in the array, the currently executing eBPF program then determines the corresponding eBPF program to tail call to, based on the type of action indicated by the element. For example, after executing the action (e.g., output: 2) corresponding to the first element of the array, the currently executing eBPF program (e.g., eBPF action program $442_3$) may look-up the action type indicated by the second element of the array and determine the next eBPF program that may be tail called. In the example above, the second element of the array indicates action type "push-VLAN: 100," based on which, the eBPF action program $442_3$ may determine that the eBPF program containing bytecode instructions for performing a push_VLAN action is indexed at number 1 (e.g., shown as eBPF action program $442_1$). As a result, the currently executing eBPF action program $442_3$ increments the element counter from 1 to 2 and tail calls to eBPF action program $442_1$ while also transferring the state of the process (e.g., flow key and element counter).

At 542, the eBPF fast path 314 executes the next eBPF action program (e.g., with index number 1, eBPF action program $442_1$) as identified by the next element of the array (e.g., element 2 of the array, in the example above).

At 544, the currently executing eBPF action program determines if there is a next element in the array. If the array does not have any additional elements for examination, at 546, the currently executing eBPF action program tail calls to the deparser and, at 548, the deparser applies the necessary changes to contents of the packet. If, however, there is a next element in the array, the currently executing eBPF action program loops back to step 530 again to examine the next element and determine the indicated action type.

As described above, although not shown in FIG. 1, in some other embodiments, hypervisor 112 can be installed directly on host machine 101 and insert a virtualization layer between the hardware and each one of guest operating systems of the VMs 130. Accordingly, it's important to note that although the embodiments above described configuring slow path 118 and eBPF fast path 314 in the user-space and kernel space of host operating system 110, respectively, in embodiments where hypervisor 112 is directly installed on host machine 101, slow path 118 and eBPF fast path may be configured, as discussed above in relation to FIGS. 3-5b, in the user space and kernel space of hypervisor 112, respectively. In such embodiments, the kernel space of hypervisor 112 may be configured with all the components that enable the loading and configuration of eBPF programs, as described above in relation to FIGS. 3-5b. For example, hypervisor 112 may be configured with the eBPF verifier 356 and other infrastructure components that the kernel space of host operating system 110 (e.g., Linux OS) is configured with as described above. Further, it should be noted that, in other embodiments, the slow path and fast path may not necessarily be in the user space and kernel space, respectively. For example, both the fast path and slow path may be in the user space, both the fast path and the slow path may be in the kernel space, etc.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers." OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that further performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for processing data packets at a generic packet filtering subsystem on a host machine, the method comprising:
   receiving a packet;
   generating a flow key by parsing at least one of header information and metadata of the packet;
   looking up a flow table to determine whether there is a match for the flow key;
   identifying a fixed length array returned by the flow table based on the flow key, the fixed-length array including a plurality of elements, wherein each of the plurality of elements provides an indication of a type of action to execute on the packet; and
   executing one or more actions corresponding to one or more types of actions indicated by the plurality of elements of the fixed-length array using one or more action programs.

2. The method of claim 1, wherein the generic packet filtering subsystem comprises an extended Berkeley Packet Filter (eBPF) subsystem.

3. The method of claim 1, wherein the generic packet filtering subsystem is configured to at least one of:
   disallow loading an action program that exceeds a certain fixed number of bytecode instructions into a kernel space of a host operating system running on the host machine; or
   disallow loading an action program having bytecode instructions that comprise dynamic looping into the kernel space of the host operating system running on the host machine.

4. The method of claim 1, wherein each of the plurality of elements further includes action-specific metadata relating to the packet.

5. The method of claim 1, wherein the executing the one or more actions further comprises:
   examining, using a program, a first element of the plurality of elements of the fixed-length array to determine a type of action indicated by the first element to execute on the packet;
   identifying, using the program, a first action program from the one or more action programs to execute a first action corresponding to the type of action indicated by the first element, based on the examining; and
   tail calling, using the program, to the first action program; and
   executing, using the first action program, the first action utilizing action-specific metadata from the first element.

6. The method of claim 5, wherein the tail calling further comprises transferring a state from the program to the first action program.

7. The method of claim 6, wherein the state comprises the key and an array index number of the first element.

8. The method of claim 5, wherein the executing the one or more actions further comprises:
   examining, using the first action program, a second element of the plurality of elements of the fixed-length array to determine a type of action indicated by the second element to execute on the packet;
   identifying, using the first action program, a second action program from the one or more action programs to execute a second action corresponding to the type of action indicated by the second element based on the examining;
   tail calling, using the first action program, to the second action program; and
   executing, using the second action program, the second action utilizing action-specific metadata from the second element.

9. A non-transitory computer readable medium comprising instructions to be executed in a computer system, wherein the instructions when executed in the computer system perform a method for processing data packets at a generic packet filtering subsystem on a host machine, the method comprising:
   receive a packet;
   generate a flow key by parsing at least one of header information and metadata of the packet;
   look up a flow table to determine whether there is a match for the flow key;
   identify a fixed length array returned by the flow table based on the flow key, the fixed-length array including a plurality of elements, wherein each of the plurality of elements provides an indication of a type of action to execute on the packet;

execute one or more actions corresponding to one or more types of actions indicated by the plurality of elements of the fixed-length array using one or more action programs.

10. The non-transitory computer readable medium of claim 9, wherein the generic packet filtering subsystem comprises an extended Berkeley Packet Filter (eBPF) subsystem.

11. The non-transitory computer readable medium of claim 10, wherein the generic packet filtering subsystem is configured to at least one of:
disallow loading an action program that exceeds a certain fixed number of bytecode instructions into a kernel space of a host operating system running on the host machine; or
disallow loading an action program having bytecode instructions that comprise dynamic looping into the kernel space of the host operating system running on the host machine.

12. The non-transitory computer readable medium of claim 9, wherein each of the plurality of elements further includes action-specific metadata relating to the packet.

13. The non-transitory computer readable medium of claim 9, wherein the executing the one or more actions further comprises:
examining, using a program, a first element of the plurality of elements of the fixed-length array to determine a type of action indicated by the first element to execute on the packet;
identifying, using the program, a first action program from the one or more action programs to execute a first action corresponding to the type of action indicated by the first element, based on the examining; and
tail calling, using the program, to the first action program; and
executing, using the first action program, the first action utilizing action-specific metadata from the first element.

14. The non-transitory computer readable medium of claim 13, wherein the tail calling further comprises transferring a state from the program to the first action program.

15. The non-transitory computer readable medium of claim 14, wherein the state comprises the key and an array index number of the first element.

16. The non-transitory computer readable medium of claim 13, wherein the executing the one or more actions further comprises:
examining, using the first action program, a second element of the plurality of elements of the fixed-length array to determine a type of action indicated by the second element to execute on the packet;
identifying, using the first action program, a second action program from the one or more action programs to execute a second action corresponding to the type of action indicated by the second element based on the examining;
tail calling, using the first action program, to the second action program; and
executing, using the second action program, the second action utilizing action-specific metadata from the second element.

17. A computer system comprising:
one or more virtual machines; and
a hypervisor serving as an interface between the one or more virtual machines and hardware resources of the computer system, the hypervisor comprising a virtual switch that comprises:
a slow path subsystem used for configuring a fast path subsystem with a fixed-length array; and
the fast path subsystem configured to:
receive a packet for a virtual machine of the one or more virtual machines;
generate a flow key by parsing at least one of header information and metadata of the packet;
look up a flow table to determine whether there is a match for the flow key;
identify a fixed length array returned by the flow table based on the flow key, the fixed-length array including a plurality of elements, wherein each of the plurality of elements provides an indication of a type of action to execute on the packet;
execute one or more actions corresponding to one or more types of actions indicated by the plurality of elements of the fixed-length array using one or more action programs.

18. The computer system of claim 17, wherein the fast path comprises an extended Berkeley Packet Filter (eBPF) subsystem.

19. The computer system of claim 18, wherein the fast path is configured to at least one of:
disallow loading an action program that exceeds a certain fixed number of bytecode instructions into a kernel space of a host operating system running on the host machine; or
disallow loading an action program having bytecode instructions that comprise dynamic looping into the kernel space of the host operating system running on the host machine.

20. The computer system of claim 17, wherein each of the plurality of elements further includes action-specific metadata relating to the packet.

21. The computer system of claim 17, wherein the executing the one or more actions further comprises:
examining, using a program, a first element of the plurality of elements of the fixed-length array to determine a type of action indicated by the first element to execute on the packet;
identifying, using the program, a first action program from the one or more action programs to execute a first action corresponding to the type of action indicated by the first element, based on the examining; and
tail calling, using the program, to the first action program; and
executing, using the first action program, the first action utilizing action-specific metadata from the first element.

22. The computer system of claim 21, wherein the tail calling further comprises transferring a state from the program to the first action program.

23. The computer system of claim 22, wherein the state comprises the key and an array index number of the first element.

24. The computer system of claim 21, wherein the executing the one or more actions further comprises:
examining, using the first action program, a second element of the plurality of elements of the fixed-length array to determine a type of action indicated by the second element to execute on the packet;
identifying, using the first action program, a second action program from the one or more action programs to execute a second action corresponding to the type of action indicated by the second element based on the examining;

tail calling, using the first action program, to the second action program; and executing, using the second action program, the second action utilizing action-specific metadata from the second element.

* * * * *

UNITED STATES PATENT AND TRADEMARK OFFICE
CERTIFICATE OF CORRECTION

PATENT NO.        : 10,530,711 B2
APPLICATION NO.   : 15/808161
DATED             : January 7, 2020
INVENTOR(S)       : Cheng-Chun Tu, Jonathan Stringer and Justin Pettit It is certified that error appears in the above-identified patent and that said Letters Patent is hereby corrected as shown below:

On the Title Page

The first inventor's name should be corrected from "Cheng-Chun Yu" to "Chen Chun Tu"

Signed and Sealed this
Seventeenth Day of March, 2020

Andrei Iancu
*Director of the United States Patent and Trademark Office*